June 22, 1926.
P. R. MURDOCK
1,589,654
METHOD OF MOLDING GLASS AND APPARATUS THEREFOR
Filed April 28, 1925    2 Sheets-Sheet 1
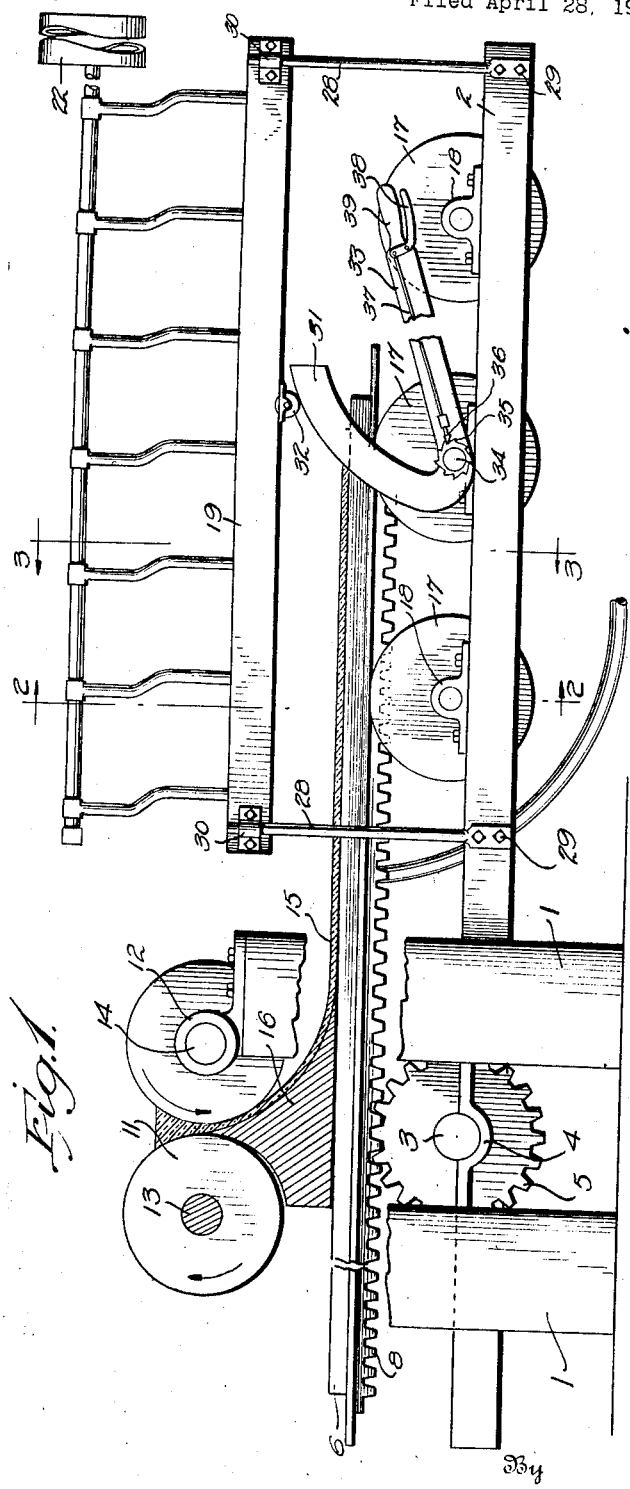
Inventor
PAUL R. MURDOCK June 22, 1926.
P. R. MURDOCK
1,589,654
METHOD OF MOLDING GLASS AND APPARATUS THEREFOR
Filed April 28, 1925  2 Sheets-Sheet 2
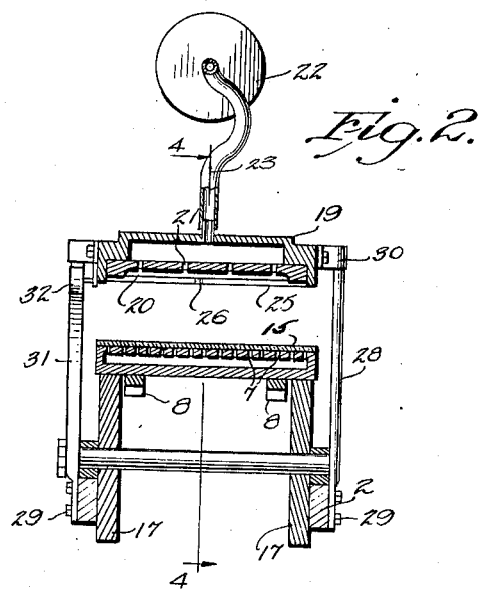
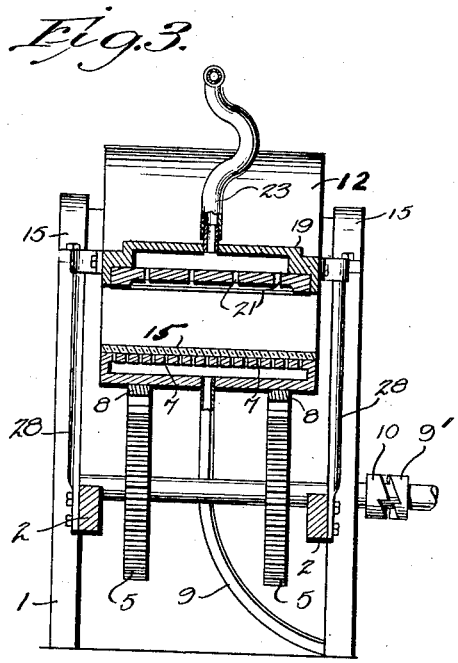
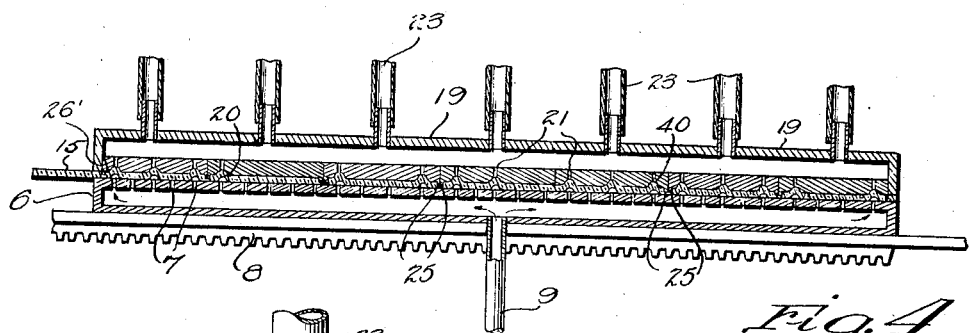
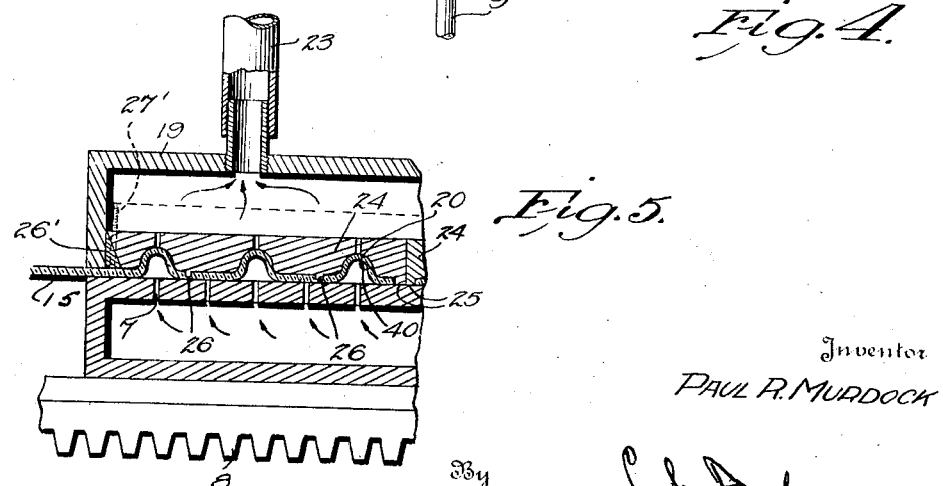
Inventor
PAUL R. MURDOCK
By
Attorney Patented June 22, 1926.

1,589,654

UNITED STATES PATENT OFFICE.

PAUL R. MURDOCK, OF PADEN CITY, WEST VIRGINIA.

METHOD OF MOLDING GLASS AND APPARATUS THEREFOR.

Application filed April 28, 1925. Serial No. 26,501.

This invention relates to methods of molding glass and similar materials, and apparatus therefor.

In constructing glass letters for signs and the like, it is customary to heat a sheet of glass and place it in a mold to mold the desired letter or character in the sheet of glass.

In the present invention, a sheet of glass in semi-fluid form is delivered to a mold as it is formed and is then submitted to differential pressure to cause the semi-fluid glass to assume the shape of the interior of the mold.

In forming the letters or other characters, I preferably employ a mold of two sections, having fluid chambers adjacent their faces and the faces are perforated. The fluid chambers are connected to a source of suction or pressure, whereby the glass is forced into the cavities of the mold to produce raised letters or other characters in the sheet of glass.

In the accompanying drawings, I have shown an organization of apparatus elements particularly suitable for use in practicing the process and forming a part of the invention. In this showing:

Figure 1 is a side elevation,

Figure 2 is a transverse sectional view on line 2—2 of Figure 1,

Figure 3 is a similar view on line 3—3 of Figure 1,

Figure 4 is a longitudinal sectional view on line 4—4 of Figure 2,

Figure 5 is a similar view on an enlarged scale,

Figure 6 is a bottom plan view of a portion of the upper half of the mold, and,

Figure 7 is a view of a sheet of glass having the letter A formed thereon.

Referring to the drawings, the reference numeral 1 designates suitable posts or standards upon which the apparatus is mounted and these posts are adapted to support a pair of longitudinal beams 2. A shaft 3 is mounted in suitable bearings 4, supported by the posts, and this shaft carries a pair of pinions 5. The lower half of the mold consists of a casing 6 having a plurality of perforations 7 formed in its upper face. A pair of rack bars 8 are arranged on the bottom of the lower mold section and adapted to mesh with the pinions 5, to permit reciprocation of the lower mold section when the shaft 3 is revolved. The lower mold section is connected to a source of pressure (not shown), by a pipe 9. A clutch element 9' is loosely mounted on the shaft 3 and connected to a suitable source of power. A second clutch element 10 is keyed to the shaft and is adapted to engage the first element when the shaft is to be driven. A pair of rollers 11 and 12 are mounted on shafts 13 and 14 over the lower mold sections. Revolution of the rollers is adapted to feed a sheet of glass to the upper face of the lower mold section as indicated by the reference numeral 15. A guide block 16 is arranged between the rollers and the lower mold section to guide the sheet of glass onto the mold section. A plurality of supporting rolls 17 are mounted in suitable bearings 18 carried by the beams 2 and are adapted to support the lower mold section.

The upper mold section comprises a casing 19, having suitable cavities 20 (see Figure 5) formed in its lower face to produce raised letters or characters in the sheets of glass. The face of the upper mold section is similar to the lower section being provided with perforations 21 arranged in the cavities 20. This section is connected to suitable suction producing means 22 by pipes 23. It is frequently desirable to form separate rectangular glass members upon which a single letter or character is produced and for this purpose, I provide facing members 24, adapted to be arranged within the upper mold section. As shown, these facing members 24 are provided with ribs 25 at each end, forming a relatively thin connecting strip of glass between two of the units or sections, to permit easy separation. The facing members may be further provided with studs or pins 26, adapted to project partially through the sheet of glass, providing a recess 27. When the letters are to be held in place by nails or similar fastening elements, the material in the bottom of the recess may be readily punched out. A plurality of these facing members are arranged in the upper mold section and retained in position by a tapered key or gib 26'. The key is retained in the frame by screws 27'. The upper mold section is vertically movable and is supported on posts 28. As shown, these posts are secured to the beams 2 by bolts 29 and are received in sleeves 30, carried by the upper mold section. The upper mold section is retained in raised position by an arm 31, engaging a roll 32, carried by the upper mold section. This arm is extended to form a lever 33 and is rotatably mounted on the shaft 34 of one of the rollers 17. A ratchet 35 is also mounted on the shaft and is adapted to be engaged by a dog or pawl 36 formed on the end of lever 37. The lever 37 is controlled by a hand lever 38 arranged adjacent the handle 39 of the lever 33.

In practicing the process, the lower mold section is first moved to the left by revolving the shaft 3 in a counter-clockwise direction. The rolls 11 and 12 are revolved when the machine is in use and a quantity of glass is poured from a ladle between the rolls to deliver a sheet of glass over the guide 16. When the end of the sheet of glass reaches the table formed by the lower mold section, the shaft 3 is revolved in a clockwise direction to reciprocate the table to the right to feed the sheet of glass onto the surface of the table. After the sheet of glass has been arranged on the surface of the lower mold section and while it is still in a molten or semi-fluid condition, the upper mold section is lowered by releasing the lever 33. The proper facing members 24 having previously been arranged in the upper mold section, the apparatus is then ready for the formation of the desired letters or characters. With the parts in the position shown in Figure 4 of the drawings, a suitable fluid such as air, is introduced into the casing 6 through pipe 9, or a vacuum is created in the casing 19 by withdrawing the air therein through the pipes 23. Either vacuum, pressure, or both may be employed in forming the characters. It will be apparent that when a greater pressure is applied to the lower face of the sheet of semi-fluid glass, than to the upper face, the glass will tend to flow into the cavities 20, formed in the facing members of the upper mold section. This will produce raised portions 40, corresponding to the depressions or cavities in the upper mold section. It will be apparent that any desired letter or character may be raised in the face of the sheet of glass by employing suitable facing members. As stated, the facing members are provided with ribs 25 by means of which separate units 41 having one or more characters, may be readily formed and easily separated from each other. Heretofore, it has been necessary in employing signs of this character, to drill holes in the glass for the reception of suitable fastening elements, and this practice has resulted in great waste due to breakage in the drilling operation. By providing the studs or pins 26 in the upper mold section, which project nearly through the sheet of glass, I form the recesses 27 and the thin sheet of glass at the bottom of the recess may be readily removed without liability of breakage. As the stud does not extend entirely through the glass, the difference in pressure on the upper and lower faces of the glass sheet is not disturbed.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a mold comprising a lower casing having a fluid chamber, an upper casing having a fluid chamber, one of said casings being provided with cavities in its face, means for creating a difference in pressure in said chambers, and means for communicating the pressure difference to opposite sides of a sheet of glass arranged between said casings.

2. In a device of the character described, a mold comprising upper and lower sections, said upper section comprising a casing forming a fluid chamber, said lower section comprising a casing forming a fluid chamber, the upper face of said lower section being provided with a plurality of perforations, the face of one of said sections being provided with cavities, and means for creating a difference in pressure in said chambers.

3. In a device of the character described, a mold comprising upper and lower sections adapted to receive a sheet of molten glass between them, each of said sections being provided with perforations in its adjacent face, one of said sections being provided with cavities into which the glass is adapted to flow, and means for establishing a difference in pressure in said sections, whereby the glass is caused to flow into said cavities.

4. In a device of the character described, a mold comprising upper and lower sections adapted to receive a sheet of molten glass between them, each of said sections being provided with perforations in its adjacent face, facing members adapted to be arranged in one of said sections in contact with the sheet of glass, said facing members being provided with perforations and being further provided with cavities corresponding to the characters to be formed in the sheet of glass, and means for establishing a difference in pressure in said mold sections.

5. In a device of the character described, a tank adapted to contain molten glass, means for feeding the glass from said tank in the form of a sheet, a lower mold section adapted to receive said sheet of glass, said mold section being capable of reciprocation to permit the sheet of glass to be progressively fed onto said mold section in a semi-fluid condition as it is formed, an upper vertically movable mold section adapted to be arranged over said sheet of glass, one of said mold sections being provided with cavities in its face, means for creating a difference in pressure in said mold sections, and means for communicating said difference in pressure to opposite sides of the sheet of glass.

6. In a device of the character described, a mold comprising upper and lower sections, one of said sections being provided with cavities in its face, a fluid chamber formed in one of said sections, said chamber communicating with the face of said section, and means connecting said chamber to a source of differetial pressure whereby a difference in pressure on the opposite sides of a sheet of glass arranged in said mold may be obtained to cause said sheet of glass to conform to the walls of said cavity.

In testimony whereof, I affix my signature.

PAUL R. MURDOCK.